(12) United States Patent
Chen et al.

(10) Patent No.: US 6,362,721 B1
(45) Date of Patent: *Mar. 26, 2002

(54) ELECTRICAL DEVICE AND ASSEMBLY

(75) Inventors: Jianhua Joyce Chen, Sunnyvale; Susan Melsa Jordan, Mountain View, both of CA (US)

(73) Assignee: Tyco Electronics Corporation, Middletown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/387,275

(22) Filed: Aug. 31, 1999

(51) Int. Cl.⁷ .................................................. H01C 7/13
(52) U.S. Cl. ....................................... 338/22 R; 252/511
(58) Field of Search ......................... 338/22 R; 252/511

(56) References Cited

U.S. PATENT DOCUMENTS

| | | |
|---|---|---|
| 3,870,950 A | 3/1975 | Laass .......................... 324/556 |
| 4,237,441 A | 12/1980 | van Konynenburg et al. .......................... 338/22 R |
| 4,255,698 A | 3/1981 | Simon .......................... 320/35 |
| 4,388,607 A | 6/1983 | Toy et al. ................ 338/22 SD |
| 4,534,889 A | 8/1985 | van Konynenburg et al. .......................... 252/511 |
| 4,545,926 A | 10/1985 | Fouts, Jr. et al. ............ 252/511 |
| 4,560,498 A | 12/1985 | Horsma et al. .............. 252/511 |
| 4,591,700 A | 5/1986 | Sopory ....................... 219/505 |
| 4,654,511 A | * 3/1987 | Horsma et al. .............. 219/548 |
| 4,689,475 A | 8/1987 | Matthiesen .................. 219/553 |
| 4,724,417 A | 2/1988 | Au et al. .................... 338/22 R |
| 4,774,024 A | 9/1988 | Deep et al. .................. 252/511 |
| 4,800,253 A | 1/1989 | Kleiner et al. ............... 219/553 |
| 4,935,156 A | 6/1990 | van Konynenburg et al. .......................... 219/553 |
| 4,973,936 A | 11/1990 | Dimpault-Darcy et al. ............... 338/22 R |
| 4,980,541 A | * 12/1990 | Shafe et al. ............... 338/22 R |
| 5,049,850 A | 9/1991 | Evans et al. ............... 338/22 R |
| 5,057,674 A | * 10/1991 | Smith-Johannsen ....... 338/22 R |
| 5,089,801 A | 2/1992 | Chan et al. ................ 338/22 R |
| 5,150,033 A | 9/1992 | Conway ....................... 320/51 |
| 5,174,924 A | 12/1992 | Yamada et al. ............. 252/511 |
| 5,250,228 A | 10/1993 | Baigrie et al. ............. 252/511 |
| 5,378,407 A | 1/1995 | Chandler et al. ........... 252/513 |
| 5,436,609 A | 7/1995 | Chan et al. ................ 338/22 R |
| 5,451,919 A | 9/1995 | Chu et al. .................. 338/22 R |
| 5,580,493 A | 12/1996 | Chu et al. ................... 252/511 |
| 5,582,770 A | 12/1996 | Chu et al. ................... 252/511 |
| 5,592,068 A | 1/1997 | Gregory et al. ............... 320/21 |
| 5,747,147 A | 5/1998 | Wartenberg et al. ........ 428/209 |
| 5,793,276 A | * 8/1998 | Tosaka et al. ............. 338/22 R |
| 5,801,612 A | * 9/1998 | Chandler et al. .......... 338/22 R |
| 5,864,281 A | 1/1999 | Zhang et al. .............. 338/22 R |
| 5,874,885 A | 2/1999 | Chandler et al. ............. 338/22 |
| 6,130,597 A | 10/2000 | Toth et al. ................. 338/22 R |

FOREIGN PATENT DOCUMENTS

| | | | |
|---|---|---|---|
| GB | 2 220 296 A | * | 1/1990 |
| JP | 4-75287 | | 10/1992 |
| WO | WO 96/29711 A | * | 9/1996 |

* cited by examiner

Primary Examiner—Karl D. Easthom
(74) Attorney, Agent, or Firm—Marquerite Gerstner

(57) ABSTRACT

A circuit protection device is formed from a resistive element composed of a PTC conductive polymer composition and two electrodes. The conductive polymer composition contains ethylene/vinyl acetate copolymer having a vinyl acetate component of less than 30% by weight of the copolymer, and a melting point of at most 105° C. Devices of the invention have a resistive element thickness of 0.025 to 0.25 mm; a crosslinking level equivalent to 1 to 20 Mrads; a surface area of at most 120 mm²; a resistance at 20° C., $R_{20}$, of at most 0.050 ohm; and a PTC anomaly from 20° C. to ($T_m$+5° C.) of at least $10^{3.5}$. The devices can be used as part of an assembly in which the device is in contact with a battery, e.g. a rechargeable battery.

15 Claims, 2 Drawing Sheets

ELECTRICAL DEVICE AND ASSEMBLY

BACKGROUND OF THE INVENTION

1. Field of the Invention

This invention relates to circuit protection devices comprising conductive polymers, particularly to improved circuit protection devices for use in protecting batteries.

2. Introduction to the Invention

Circuit protection devices for use in protecting batteries from overcurrent and overtemperature conditions are well-known. See, for example, U.S. Pat. Nos. 4,255,698 (Simon), U.S. Pat. No. 4,973,936 (Dimpault-Darcy et al), U.S. Pat. No. 5,801,612 (Chandler et al), U.S. Pat. No. 5,580,493 (Chu et al), and Japanese Utility Model Application No. 4-75287 (filed Oct. 29, 1992), the disclosures of which are incorporated herein by reference. In these applications, a device which exhibits a positive temperature coefficient of resistance (PTC behavior) is connected in series with a battery terminal. During normal operation the PTC device is in a low resistance, low temperature condition. When a very high current occurs, for example, due to a short circuit, or a very high temperature occurs, for example, during excessive charging, the device "switches" into a high resistance, high temperature condition, thus decreasing the current through the battery to a low level and protecting the battery and any components in electrical contact with the battery. The temperature at which this transition from low resistance to high resistance occurs is the switching temperature, $T_s$. $T_s$ is defined as the temperature at the intersection point of extensions of the substantially straight portions of a plot of the log of the resistance of the PTC element as a function of the temperature which lie on either side of the portion of the curve showing a sharp change in slope.

Battery packs, in which a plurality of batteries, i.e. cells, are present, are commonly used with electrical equipment such as cameras, video recorders, tools, portable computers, personal data assistants (PDAs) and cellular phones. It is desirable to make the battery packs as small and lightweight as possible, but still provide adequate protection in the event of a short circuit, a runaway charge fault, charging at the wrong voltage, and/or reverse charging. One technique to maximize the use of space in the battery pack is to place the PTC device directly onto the button terminal of the battery, inside the battery pack. If the device is in the form of a disk with a central hole, the hole can be sized to allow it to be placed over the button terminal. Electrical connection is then made from an electrode on one surface of the disk to the button terminal and from an electrode on the opposite surface of the disk to a second battery. Alternatively, the PTC device can be in the form of a chip with attached straps. One strap is electrically connected to the button terminal of one battery and the other strap is attached to the second battery. Such an arrangement is useful in applying the device outside the battery pack.

While battery packs are used for many portable electronic devices, the battery packs used for cellular phones have special requirements. Due to the digital nature of such phones, battery packs are discharged in short bursts of high current. Because the circuit protection device is in series with the cells of the pack, there may be an unacceptable high voltage drop across the protection device if the device resistance in the unswitched state is too high. This attenuates the pulse and results in audio static as well as reduced battery capacity. In addition to requiring a very low resistance, i.e. less than 0.030 ohms, and preferably less than 0.025 ohms, it is desirable that the device have a low switching temperature, i.e. less than 100° C., and preferably less than 90° C., so that batteries with relatively long discharge times, e.g., nickel-metal hydride batteries and lithium-ion batteries, which are sensitive to overtemperature conditions switch at a temperature low enough to prevent damage to the battery itself or the case surrounding it. In addition to the very low resistance and very low switching temperature requirements, it is necessary that the device have sufficient PTC anomaly so that it can withstand the voltage required for the application, e.g. 8 to 24 volts. Thus an appropriate circuit protection device will provide recharging protection by protection in the event of overtemperature conditions, and will provide discharging protection by protecting in the event of overcurrent conditions. In addition, the device should be as small as possible in order to conserve space within the battery pack, an important consideration as equipment becomes smaller.

BRIEF SUMMARY OF THE INVENTION

We have now found that by using a particular conductive polymer composition, an improved circuit protection device for battery pack protection against both overtemperature and overcurrent conditions can be made. The resulting devices have a low resistance and a low switching temperature, yet have a PTC anomaly of $10^{3.5}$ or greater. Such devices allow improved protection of batteries used in portable electronic equipment because their low resistance results in minimal voltage drop and therefore will cause minimal distortion of signals and loss of battery capacity, and their very low switching temperature provides protection against overheating. The PTC anomaly of $10^{3.5}$ or greater will provide sufficient voltage withstand for battery protection applications. These improvements in protection are achieved without an undesired decrease in current-carrying capacity under operating conditions.

Thus, in a first aspect, this invention provides a circuit protection device which comprises a circuit protection device which comprises (A) a resistive element which is composed of a PTC conductive polymer composition which comprises
  (1) a polymeric component comprising an ethylene/vinyl acetate copolymer having
    (a) units derived from a first monomer which is ethylene,
    (b) units derived from a second monomer which (i) is vinyl acetate, and (ii) comprises less than 30% by weight of the ethylene/vinyl acetate copolymer, and
    (c) a melting point $T_m$ of at most 105° C., and
  (2) dispersed in the polymeric component, a particulate conductive filler; and
(B) two electrodes which
  (1) are attached to the resistive element, and
  (2) can be connected to a source of electrical power, said device having the following characteristics:

(i) a resistive element thickness of 0.025 to 0.25 mm;
(ii) a crosslinking level equivalent to 1 to 20 Mrads;
(iii) a surface area of at most 120 mm$^2$;
(iv) a resistance at 20° C., $R_{20}$, of at most 0.050 ohm; and
(v) a PTC anomaly from 20° C. to ($T_m$+5° C.) of at least $10^{3.5}$.

Such a device is particularly useful for protecting batteries. Therefore, in a second aspect, the invention provides an assembly which comprises (I) a battery; and (II) a circuit protection device of the first aspect of the invention which is in electrical contact with the battery.

DETAILED DESCRIPTION OF THE INVENTION

Figure 1:
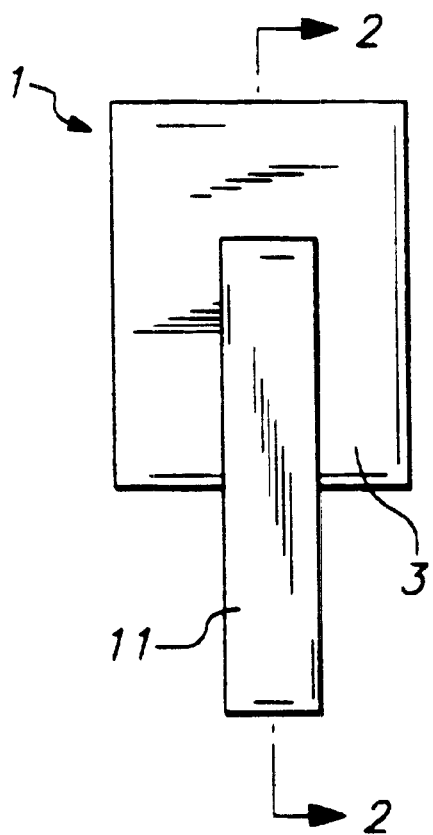
FIG. 1 is a plan view of a device of the invention.

The circuit protection device of the invention comprises a resistive element composed of a PTC conductive polymer composition. Such compositions comprise a polymeric component, and dispersed therein, a particulate conductive filler such as carbon black or metal. Conductive polymer compositions are described in U.S. Pat. Nos. 4,237,441 (van Konynenburg et al), U.S. Pat. No. 4,545,926 (Fouts et al), U.S. Pat. No. 4,724,417 (Au et al), U.S. Pat. No. 4,774,024 (Deep et al), U.S. Pat. No. 4,935,156 (van Konynenburg et al), U.S. Pat. No. 5,049,850 (Evans et al), U.S. Pat. No. 5,250,228 (Baigrie et al), U.S. Pat. No. 5,378,407 (Chandler et al), U.S. Pat. No. 5,451,919 (Chu et al), U.S. Pat. No. 5,582,770 (Chu et al), U.S. Pat. No. 5,747,147 (Wartenberg et al), and U.S. Pat. No. 5,801,612 (Chandler et al), and in copending, commonly assigned U.S. application Ser. No. 08/798,887 (Toth et al, filed Feb. 10, 1997). Now U.S. Pat. No. 6,130,597. The disclosure of each of these patents and applications is incorporated herein by reference.

The composition of the device exhibits positive temperature coefficient (PTC) behavior, i.e., it shows a sharp increase in resistivity with temperature over a relatively small temperature range. The term "PTC" is used to mean a composition or device that has an $R_{14}$ value of at least 2.5 and/or an $R_{100}$ value of at least 10, and it is preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resisitivities at the end and the beginning of a 30° C. range. It is preferred that compositions used in the devices of the invention show a PTC anomaly at at least one temperature over the range from 20° C. to $(T_m+5°$ C.) of at least $10^{3.5}$, preferably of at least $10^{3.7}$, particularly of at least $10^{3.9}$, i.e. the log[resistance at $(T_m+5°$ C.)/resistance at 20° C.] is at least 3.5, preferably at least 3.7, particularly at least 3.9. If the maximum resistance is achieved at a temperature $T_x$ that is below $(T_m+5°$ C.), the PTC anomaly is determined by the log(resistance at $T_x$)/resistance at 20° C.). In order to ensure that effects of processing and thermal history are neutralized, at least one thermal cycle from 20° C. to $(T_m+5°$ C.) and back to 20 ° C. should be conducted before the PTC anomaly is measured.

The polymeric component of the composition comprises an ethylene/vinyl acetate (EVA) copolymer having units derived from a first monomer which is ethylene, $CH_2$—$CH_2$, and a second monomer which is a vinyl acetate having the formula $CH_2$=$CHCOOC_6H_5$. The second monomer, i.e. the vinyl acetate component, comprises less than 30%, preferably less than 25%, particularly less than 20%, especially less than 15% by weight of the copolymer, e.g. 8 to 12% by weight. In this application, the term "copolymer" includes polymers which are terpolymers and comprise a third monomer. For some applications it may be desirable to blend the EVA copolymer with one or more additional polymers, e.g. an elastomer, an amorphous thermoplastic polymer, another crystalline polymer, or a wax, in order to achieve specific physical or thermal properties, e.g. flexibility or maximum exposure temperature. The polymeric component has a melting temperature, as measured by the peak of the endotherm of a differential scanning calorimeter, of $T_m$. When there is more than one peak, $T_m$ is defined as the temperature of the highest temperature peak. For compositions suitable for battery protection devices, polymers falling within a relatively narrow range of melting temperatures are preferred. Thus, it preferred that $T_m$ be at least 70° C. to allow for sufficient carrying current at operating temperatures which can be as high as 60° C., but is less than 105° C., preferably less than 100° C., to provide protection against overtemperature. For many applications, it is preferred that the EVA have a melt index (in grams/10 minutes, as measured by ASTM Test D1238, the disclosure of which is incorporated herein by reference) of at least 3.0.

Dispersed in the polymeric component is a particulate conductive filler that comprises carbon black. For some applications, other particulate conductive materials such as graphite, metal, metal oxide, conductive coated glass or ceramic beads, particulate conductive polymer, or a combination of these, may also be present. Such particulate conductive fillers may be in the form of powder, beads, flakes, or fibers. It is preferred, however, that the particulate filler consist essentially of carbon black that has a DBP number of 60 to 120 cm$^3$/100 g, preferably 60 to 100 cm$^3$/100 g, particularly 60 to 90 cm$^3$/100 g, especially 65 to 85 cm$^3$/100 g. The DBP number is an indication of the amount of structure of the carbon black and is determined by the volume of n-dibutyl phthalate (DBP) absorbed by a unit mass of carbon black. This test is described in ASTM D2414-93, the disclosure of which is incorporated herein by reference.

The conductive polymer composition may comprise additional components, such as antioxidants, inert fillers, nonconductive fillers, chemical crosslinking agents, radiation crosslinking agents (often referred to as prorads or crosslinking enhancers), stabilizers, dispersing agents, coupling agents, acid scavengers (e.g. $CaCO_3$), or other components.

The desired resistivity of the composition determines the amount of polymeric component, conductive filler, and optional additional components. It is preferred that the device prepared from the composition have a resistivity at 20° C., $\rho_{20}$, of at most 2.5 ohm-cm, preferably at most 2.0 ohm-cm, particularly at most 1.5 ohm-cm, especially at most 1.0 ohm-cm, more especially at most 0.8 ohm-cm. For compositions meeting these criteria, the polymeric component generally comprises at most 62% by volume, preferably at most 60% by volume, especially at most 58% by volume of the total volume of the composition. The quantity of conductive filler needed is based on the resistivity of the conductive filler itself, as well as on the required resistivity of the composition. For compositions of the invention, the conductive filler generally comprises a least 38% by volume, preferably at least 40% by volume, particularly at least 42% by volume of the total volume of the composition. The additional components generally comprise at most 20% by volume of the total composition.

While dispersion of the conductive filler and other components in the polymeric component may be achieved by any suitable means of mixing, including solvent-mixing, it is preferred that the composition be melt-processed using melt-processing equipment including mixers made by such manufacturers as Brabender™, Moriyama™, and Banbury™, and continuous compounding equipment, such as co- and counter-rotating twin screw extruders. Prior to mixing, the components of the composition can be blended in a blender such as a Henschel™ blender to improve the uniformity of the mixture loaded into the mixing equipment. The composition can be prepared by using one or more melt-mixing steps.

After mixing, the composition can be melt-shaped by any suitable method, e.g. melt-extrusion, injection-molding, compression-molding, and sintering, in order to produce a resistive element. The element may be of any shape, e.g. rectangular, square, circular, or annular. For many applications, it is desirable that the composition be extruded into sheet from which the resistive element may be cut, diced, or otherwise removed.

For the circuit protection devices of the invention the resistive element is in physical and electrical contact with at least one electrode that is suitable for connecting the element to a source of electrical power. The type of electrode is dependent on the shape of the element, and may be, for example, solid or stranded wires, metal foils, metal meshes, or metallic ink layers. Particularly useful devices comprise two laminar electrodes, preferably metal foil electrodes, with the conductive polymer resistive element sandwiched between them. Particularly suitable foil electrodes have at least one surface that is microrough, preferably through electrodeposition, e.g. electrodeposited nickel or copper such as those disclosed in U.S. Pat. Nos. 4,689,475 (Matthiesen) and U.S. Pat. No. 4,800,253 (Kleiner et al), and in copending, commonly assigned U.S. application Ser. No. 08/816,471 (Chandler et al, filed Mar. 13, 1997), now U.S. Pat. No. 5,874,885 the disclosure of each of which is incorporated herein by reference. The electrodes may be attached to the resistive element by compression-molding, nip-lamination, or any other appropriate technique. Additional metal electrical leads, e.g. in the form of wires or straps, can be attached to the foil electrodes to allow electrical connection to a circuit. The leads may extend in opposite directions from the surface of the resistive element to form an "axial" device, or they may extend in the same direction from the resistive element to form a "radial" device. In addition, elements to control the thermal output of the device, e.g. one or more conductive terminals, can be used. These terminals can be in the form of metal plates, e.g. steel, copper, or brass, or fins, that are attached either directly or by means of an intermediate layer such as solder or a conductive adhesive, to the electrodes. See, for example, U.S. Pat. Nos. 5,089,801 (Chan et al) and U.S. Pat. No. 5,436,609 (Chan et al).

In order to improve the electrical stability of the device, it is generally necessary to subject the resistive element to various processing techniques, e.g. crosslinking and/or heat-treatment, following shaping, before and/or after attachment of the electrodes. Crosslinking can be accomplished by chemical means or by irradiation, e.g. using an electron beam or a $Co^{60}\gamma$ irradiation source. Devices of the invention are generally crosslinked to the equivalent of 1 to 20 Mrads, preferably 1 to 15 Mrads, particularly 2 to 15 Mrads, especially 5 to 12 Mrads.

Devices of the invention are preferably exposed to a thermal treatment after the device is cut from a laminate comprising the conductive polymer composition positioned between two metal foils, and before crosslinking of the conductive polymer composition is done. A preferred procedure is described in U.S. Pat. No. 5,747,147 (Wartenberg et al), the disclosure of which is incorporated herein by reference. The device is first cut from the laminate in a cutting step. In this application, the term "cutting" is used to include any method of isolating or separating the resistive element of the device from the laminate, e.g. dicing, punching, shearing, cutting, etching and/or breaking as described in U.S. Pat. No. 5,864,281 (Zhang et al), the disclosure of which is incorporated herein by reference, or any other suitable means.

The thermal treatment requires that the device be subjected to a temperature $T_t$ that is greater than $T_m$, preferably at least ($T_m+20°$ C.), particularly at least ($T_m+50°$ C.), especially at least ($T_m+70°$ C.). The duration of the thermal exposure may be very short, but is sufficient so that the entire conductive polymer in the resistive element reaches a temperature of at least ($T_m+5°$ C.). The thermal exposure at $T_t$ is at least 0.5 seconds, preferably at least 1.0 second, particularly at least 1.5 seconds, especially at least 2.0 seconds. A suitable thermal treatment for devices of the invention made from ethylene/vinyl acetate copolymer is dipping the device into a solder bath heated to a temperature of about 240 to 245° C., i.e. at least 100° C. above $T_m$, for a period of 1.5 to 2.5 seconds. Alternatively, good results have been achieved by passing the devices through an oven on a belt and exposing them to a temperature of least 100° C. above $T_m$ for 3 seconds. During either one of these processes, electrical leads can be attached to the electrodes by means of solder.

After exposure to the thermal treatment, the device is cooled to a temperature below $T_m$, i.e. to a temperature of at most ($T_m-30°$ C.), preferably at most ($T_m-50°$ C.), especially at most ($T_m-70°$ C.). It is particularly preferred that the device be cooled to a temperature at which the conductive polymer composition has achieved 90% of its maximum crystallization. Cooling to room temperature, particularly to 20° C., is particularly preferred. The cooled device is then crosslinked, preferably by irradiation.

Devices of the invention should be is small as possible. The thickness of the resistive element is 0.025 to 0.25 mm (0.001 to 0.010 inch), preferably 0.51 to 0.20 mm (0.002 to 0.008 inch), e.g. 0.13 mm (0.005 inch). The surface area of the device (i.e. the footprint of the resistive element, not including any additional metal leads) is at most 120 $mm^2$, preferably at most 100 $mm^2$, particularly at most 90 $mm^2$, especially at most 85 $mm^2$. Larger devices tend to dissipate more heat than is desirable for most battery applications, and are more difficult to install in the available space of a battery pack.

Devices of the invention have a resistance at 20° C., $R_{20}$, of at most 0.050 ohm, preferably at most 0.040 ohm, particularly at most 0.030 ohm, especially at most 0.025 ohm, most especially at most 0.020 ohm. The $R_{20}$ value is measured after any thermal treatment, but before the device has been exposed to sufficient voltage to trip it into a high resistance state.

Devices of the invention are particularly suitable for use in a battery assembly which may comprise one or more batteries. A typical assembly comprises first and second batteries. The device is in electrical contact with at least one of the batteries, often by contacting the button terminal of the battery (i.e. the positive terminal), and may be in contact with a second battery, generally at the end opposite the button terminal end (i.e. the negative terminal). The battery for which the small devices of the invention are particularly useful is a secondary rechargeable battery of the size equivalent to type AAA, AA or 5 mm prismatic cells. Such a battery may be a nickel-cadmium, nickel-metal hydride, a lithium-ion battery or a lithium-polymer battery.

Figure 2:
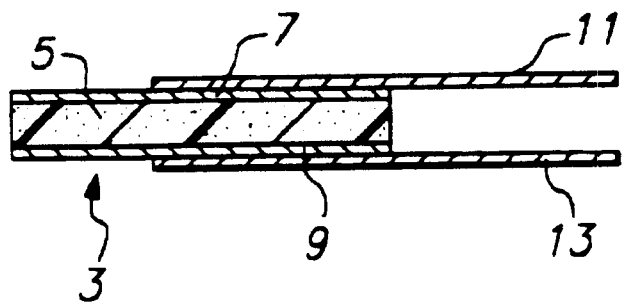
FIG. 2 is a cross-sectional view of the device of FIG. 1 along line 2—2.
Figure 3:
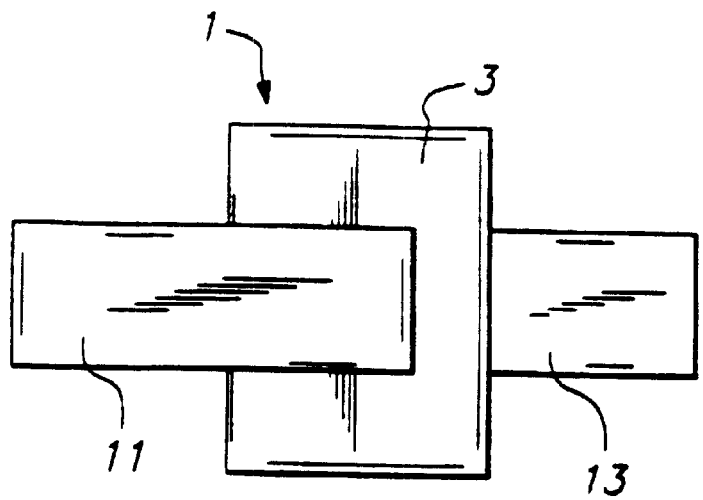
FIG. 3 is a plan view of another device of the invention.

The invention is illustrated by the drawings in which FIG. 1 is a plan view of circuit protection device 1 and FIG. 2 is a cross-sectional view along line 2—2 of FIG. 1. The device contains PTC element 3 to which are attached first and second metal leads 11,13 in a configuration to give a radial device. PTC element 3 comprises resistive element 5 which is sandwiched between two metal electrodes 7,9. FIG. 3 shows an alternative configuration for the first and second leads 11,13 to give an axial device particularly suitable for attachment to the terminals of a battery.

Figure 4:
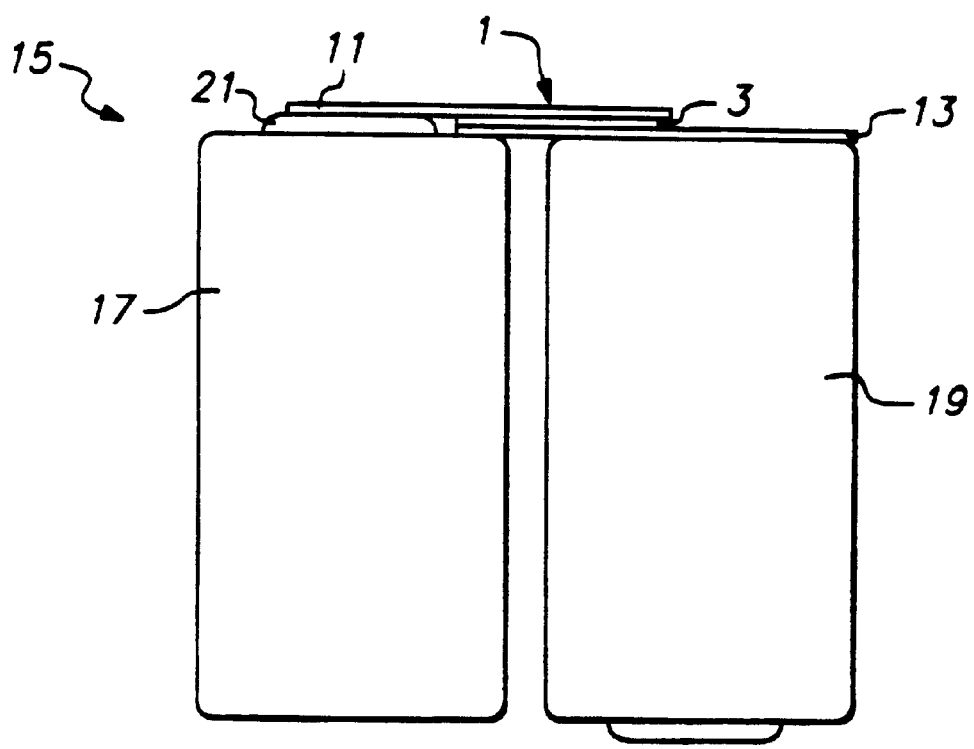
FIG. 4 is a schematic view of an assembly of the invention.

FIG. 4 is a schematic plan view of assembly 15 of the invention in which first battery 17 and second battery 19 are in physical and electrical contact with device 1. First lead 11 contacts button terminal 21 of first battery 17, while second lead 13 contacts second battery 17.

The invention is illustrated by the following examples, in which Examples 7 to 10 are comparative.

EXAMPLES 1 TO 6

Ethylene/vinyl acetate copolymer of the type and amount shown in Table I below was preblended with 40 to 42% by volume carbon black (Raven™ 430 Ultra, having a particle size of about 82 nm, a structure (DBP number) of about 80 $cm^3/100$ g, and a surface area of 34 $m^2/g$, available from Columbian Chemicals), and the blend was then mixed in a co-rotating twin screw extruder. The mixture was pelletized and extruded into a sheet having a thickness of 0.127 mm (0.005 inch). The sheet was laminated with two layers of electrodeposited nickel-copper foil (Type 31, having a thickness of 0.033 mm (0.0013 inch), available from Fukuda) to produce a laminate. Pieces of the laminate were solder-coated and PTC elements with dimensions of 5×12×0.127 mm (0.2×0.47×0.005 inch) were cut from the laminate. The PTC elements were then heat-treated in an oven with settings such that the temperature of the elements reached 165° C. for 30 seconds, 5 to 10 seconds of which were at a peak temperature of 185° C. The PTC elements were then irradiated to a total of 10 Mrads using a $Co^{60}\gamma$ irradiation source. Nickel metal leads with dimensions of 4×17×0.13 mm (0.16×0.67×0.005 inch) were attached to opposite sides of the PTC elements by reflowing the solder. The metal leads were each positioned so that a tab 5 mm (0.20 inch) extended from the edge of the PTC element. Each device was temperature cycled six cycles from −40° C. to 85° C. with a dwell time at −40° C. and 85° C. of 30 minutes. After temperature cycling, devices were tested for resistance as a function of temperature by positioning the device in an oven and measuring the resistance at intervals over the temperature range 20 to 160° C. Devices had a resistances at 20° C. of 0.016 to 0.025 ohm, and a PTC anomaly of at least $10^{3.5}$ (i.e. 3.5 decades; see Table I). The switching temperature $T_s$, as defined above, is also given in Table I and ranged from 80 to 82° C.

EXAMPLES 7 TO 10 (Comparative)

Following the procedure of Examples 1 to 6, devices were prepared using the compositions shown in Tables II and III. These compositions contained ethylene/butyl acrylate copolymer (EBA), ethylene/acrylic acid copolymer (EAA), an ionomer, or ethylene/methyl acrylic acid copolymer (EMAA). The devices of Example 7, made from an EBA-based composition, had relatively high PTC anomaly, but had a switching temperature which was too high for many applications, particularly battery applications (see Table II). The devices shown in Table III used compositions which gave relatively low switching temperatures but had low PTC anomalies, inadequate for most battery applications.

The power dissipation of the devices of the size prepared in the Examples, when mounted onto circuit boards for testing by attaching to large metal clips (such as Kelvin clips) was about 1.3W. It is desired for many battery applications for the device to have a rating of at least 9V. For an initial resistance of 0.025 ohms, this would correspond to a minimum PTC anomaly of $10^{3.5}$. If the initial resistance were lower, or the power dissipation lower, an even greater PTC anomaly would be required for the same voltage rating. As shown in the comparative examples, devices made with compositions other than those of the invention, but with similar switching temperatures and resistivities, had lower PTC anomalies. This caused an undesired decrease in voltage withstand, rendering the devices ineffective for many battery applications.

TABLE I

Examples 1 to 6 of the Invention

| Ex. | Type Polymer | Tradename | Supplier | Comonomer (% by weight) | Polymer (% by volume) | CB (% by volume) | Initial Resistance (ohm) | $T_m$ (° C.) | Melt Index (g/10 min) | $T_s$ (° C.) | PTC anomaly (decades) |
|---|---|---|---|---|---|---|---|---|---|---|---|
| 1 | EVA | Ultrathene UE635 | Equistar | 9 | 58 | 42 | 0.016 | 96 | 9.8 | 82 | 3.9 |
| 2 | EVA | Ultrathene UE637 | Equistar | 9 | 58 | 42 | 0.015 | 96 | 3.2 | 80 | 3.5 |
| 3 | EVA | Elvax 750 | DuPont | 9 | 58 | 42 | 0.014 | 96 | 7 | 82 | 3.8 |
| 4 | EVA | Elvax-650Q | DuPont | 12 | 58 | 42 | 0.016 | 95 | 8 | 80 | 3.7 |
| 5 | EVA | Ultrathene UE635 | Equistar | 9 | 59 | 41 | 0.025 | 96 | 9.8 | 82 | 4.4 |
| 6 | EVA | Ultrathene UE637 | Equistar | 9 | 60 | 40 | 0.023 | 96 | 3.2 | 80 | 4.6 |

TABLE II

Comparative Example 7

| Ex. | Polymer | Tradename | Supplier | Comonomer (% by weight) | Polymer (% by volume) | CB (% by volume) | Initial Resistance (ohm) | $T_m$ (° C.) | Melt Index (g/10 min) | $T_s$ (° C.) | PTC anomaly (decades) |
|---|---|---|---|---|---|---|---|---|---|---|---|
| 7 | EBA | Enathene 705-009 | Equistar | 5 | 58 | 42 | 0.015 | 105 | 3 | 93 | 4.6 |

TABLE III

Comparative Examples 8 to 10

| Ex. | Polymer | Tradename | Supplier | Comonomer (% by weight) | Polymer (% by volume) | CB (% by volume) | Initial Resistance (ohm) | $T_m$ (°C.) | Melt Index (g/10 min) | $T_s$ (°C.) | PTC anomaly (decades) |
|---|---|---|---|---|---|---|---|---|---|---|---|
| 8 | EAA | Primacor 1410 | Dow Chemical | 13 | 58 | 42 | 0.024 | 98.5 | 1.5 | 83 | 3.1 |
| 9 | Ionmer | Surlyn 9650 | DuPont | N/A | 58 | 42 | 0.024 | 92 | 5 | 79 | 3.4 |
| 10 | EMAA | Nucrel 1302 | DuPont | 13 | 58 | 42 | 0.027 | 96 | 1.5 | 83 | 3.0 |

What is claimed is:

1. A circuit protection device which comprises
   (A) a resistive element which is composed of a PTC conductive polymer composition which comprises
      (1) a polymeric component comprising an ethylene/vinyl acetate copolymer having
         (a) units derived from a first monomer which is ethylene,
         (b) units derived from a second monomer which (i) is vinyl acetate, and (ii) comprises less than 20% by weight of the ethylene/vinyl acetate copolymer, and
         (c) a melting point $T_m$ of at least 70° C. and at most 105° C., and
      (2) dispersed in the polymeric component, a particulate conductive filler; and
   (B) two electrodes which
      (1) are attached to the resistive element, and
      (2) can be connected to a source of electrical power,
   said device having the following characteristics:
   (i) a resistive element thickness of 0.025 to 0.25 mm;
   (ii) a crosslinking level equivalent to 1 to 20 Mrads;
   (iii) a surface area of at most 120 mm2;
   (iv) a resistance at 20° C., $R_{20}$, of at most 0.050 ohm; and
   (v) a PTC anomaly from 20° C. to ($T_m$+5° C.) of at least $10^{3.5}$.

2. A device according to claim 1 wherein the electrodes comprise metal foils.

3. A device according to claim 1 wherein the conductive filler comprises carbon black.

4. A device according to claim 3 wherein the carbon black has a DBP number of 60 to 120 cm$^3$/100 g.

5. A device according to claim 1 which further comprises at least one electrical lead attached to one electrode.

6. A device according to claim 5 which comprises two electrical leads, a first lead attached to one electrode and a second lead attached to the other electrode.

7. A device according to claim 1 wherein the device has a switching temperature $T_s$, of at most 85° C.

8. An assembly which comprises
   (I) a battery; and
   (II) a circuit protection device which is in electrical contact with the battery and which comprises
      (A) a resistive element which is composed of a PTC conductive polymer composition which comprises
         (1) a polymeric component comprising an ethylene/vinyl acetate copolymer having (a) units derived from a first monomer which is ethylene, (b) units derived from a second monomer which (i) is vinyl acetate, and (ii) comprises less than 20% by weight of the ethylene/vinyl acetate copolymer, and (c) a melting point $T_m$ of at least 70° C. and at most 105° C., and
         (2) dispersed in the polymeric component, a particulate conductive filler; and
      (B) two electrodes which
         (1) are attached to the resistive element, and
         (2) can be connected to a source of electrical power;
   said device having the following characteristics:
   (i) a resistive element thickness of 0.025 to 0.25 mm
   (ii) a crosslinking level equivalent to 1to 20 Mrads;
   (iii) a surface area of at most 120 mm$^2$;
   (iv) a resistance at 20° C., $R_{20}$, of at most 0.050 ohm; and
   (v) a PTC anomaly of at least $10^{3.5}$.

9. An assembly according to claim 8 wherein the battery is a rechargeable battery.

10. An assembly according to claim 9 wherein the battery is a nickel-cadmium battery, a nickel-metal hydride battery, a lithium-ion battery, or a lithium-polymer battery.

11. An assembly according to claim 8 which comprises first and second batteries and wherein the circuit protection device contacts the first and second batteries.

12. An assembly according to claim 11 wherein the device contacts a button terminal on the first battery.

13. An assembly according to claim 8 wherein the battery is a AA, a AAA, or a prismatic cell battery.

14. An assembly according to claim 8 which is suitable for use at voltage of at most 16 VDC.

15. An assembly according to claim 8 wherein the device comprises two leads, a first lead attached to one electrode and a second lead attached to the other electrode.

* * * * *